United States Patent [19]

MacEdmondson

[11] Patent Number: 5,458,757
[45] Date of Patent: Oct. 17, 1995

[54] HIGH POTENTIAL ELECTRODE WITH ELECTRICAL INSULATING MEANS AND INTEGRAL SAFETY MEANS

[76] Inventor: Jerry MacEdmondson, 510 Canal St., Newport Beach, Calif. 92663

[21] Appl. No.: 269,689

[22] Filed: Jul. 1, 1994

[51] Int. Cl.⁶ .............................. B01D 17/06; B03C 5/02; C10G 33/02
[52] U.S. Cl. .............................. 204/228; 96/88; 204/242; 204/286; 204/302
[58] Field of Search ...................... 204/302, 305, 204/228, 242, 280, 286, 288; 96/83, 88, 92

[56] References Cited

U.S. PATENT DOCUMENTS

| | | | |
|---|---|---|---|
| 3,547,801 | 12/1970 | Paine | 204/305 |
| 3,674,677 | 7/1972 | Roberts | 204/302 |
| 3,758,399 | 9/1973 | Pendergrass | 204/228 |
| 4,049,535 | 9/1977 | Winslow, Jr. | 204/305 |
| 4,801,370 | 1/1989 | Arnesen | 204/302 |
| 5,006,134 | 4/1991 | Knoll et al. | 96/88 |
| 5,041,145 | 8/1991 | Kakinuma et al. | 96/55 |

Primary Examiner—John Niebling
Assistant Examiner—William T. Leader
Attorney, Agent, or Firm—James G. O'Neill

[57] ABSTRACT

A high voltage electrode for supplying high potential electrical energy to dispersed electrically conductive matter suspended in a relatively non conductive continuous phase atmosphere within a sealed chamber of a vessel. The electrode receives power from a source which is external to the vessel and the electrode passes through an insulated cover secured to an opening in the vessel. The insulated cover may include further openings for receiving a fluid sensor and/or a vapor vent.

6 Claims, 1 Drawing Sheet

HIGH POTENTIAL ELECTRODE WITH ELECTRICAL INSULATING MEANS AND INTEGRAL SAFETY MEANS

BACKGROUND—Field of Invention

This invention relates to the removal of electrically conductive finely dispersed matter from a relatively electrically non conductive continuous phase atmosphere through the use of an electric field to cause agglomeration of the finely dispersed matter to speed up the gravity separation process. More particularly this invention relates to the means for supplying the electricity to the electric field.

BACKGROUND—Description of Prior Art

The use of an electric field to electrically charge electrically conductive finely dispersed matter suspended in a relatively electrically non conductive atmosphere to cause agglomeration of the finely dispersed matter to speed up the gravity separation process is well known. This process is used to remove dust from air, liquid particles from vapor and water from oil. Since my principal field of endeavor involves the removal of water from oil, as the inventor, I will describe my invention as it relates to that process. This does not, however, preclude the use of my invention in the aforementioned processes of removing dust from air, liquid from a vapor or any other process where separation can be speeded up by the application of an electric field.

As part of the process for removing water from oil the use of an electrical field is often employed to electrically charge the water droplets thereby causing their agglomeration which will then result in faster gravity separation.

This process is normally carried out in a vessel in which are arranged electrodes suspended by insulators inside the vessel and an electrical system through which an electrical potential is supplied to the suspended electrodes.

Electricity is supplied to the suspended electrodes through the vessel wall by means of an electrical conducting wire that must be insulated and sealed in a manner so as to prevent the leakage of electricity to the vessel wall and leakage of pressure to the electrical source. Related arrangements for supplying electricity to insulated electrodes suspended inside of vessels are shown in U.S. Pat. Nos. 3,674,677 and 4,049,535.

A persistent problem of supplying the power to the electric field in the manner described is with the leakage of electricity to the electrically conducting material in proximity to the juncture where the electricity passes through the vessel wall. The "short circuiting" of the electricity will negate the electricity supply to the electric field. Another persistent problem is pressure leakage from the vessel to the electric power source, usually a step up transformer contained in a sealed metal container. The leakage of pressure can damage, the transformer and can contaminate the electrically non conducting fluid inside the transformer container.

OBJECTS AND ADVANTAGES

Accordingly, some objects and advantages of the present invention are:

a) to provide a means for supplying the electricity to an electric field used to electrically charge, electrically conductive, finely dispersed matter suspended in a relatively electrically, non conductive continuous phase atmosphere in a manner that will prevent leakage of electricity to the electrically conducting material in proximity to the juncture where the power supply passes through a vessel wall.

b) and further to supply the electricity in a manner that will preclude the leakage of pressure from the vessel to the power source.

Further objects and advantages are to provide a means for supplying electricity to an electrical field inside a vessel with such means, when in the application of separating water from oil, will include an integral device for shutting off the electricity supply if the electric field becomes exposed to vapor as the continuous phase atmosphere, and still further will incorporate, when in use in oil/water separation service, an integral device for the automatic removal of the vapor; thereby eliminating the continuous phase vapor atmosphere for reversion back to the continuous phase liquid atmosphere. Still further objects and advantages will become apparent from a consideration of the ensuing description and drawing.

DESCRIPTION OF THE PREFERRED EMBODIMENT

Figure 1:
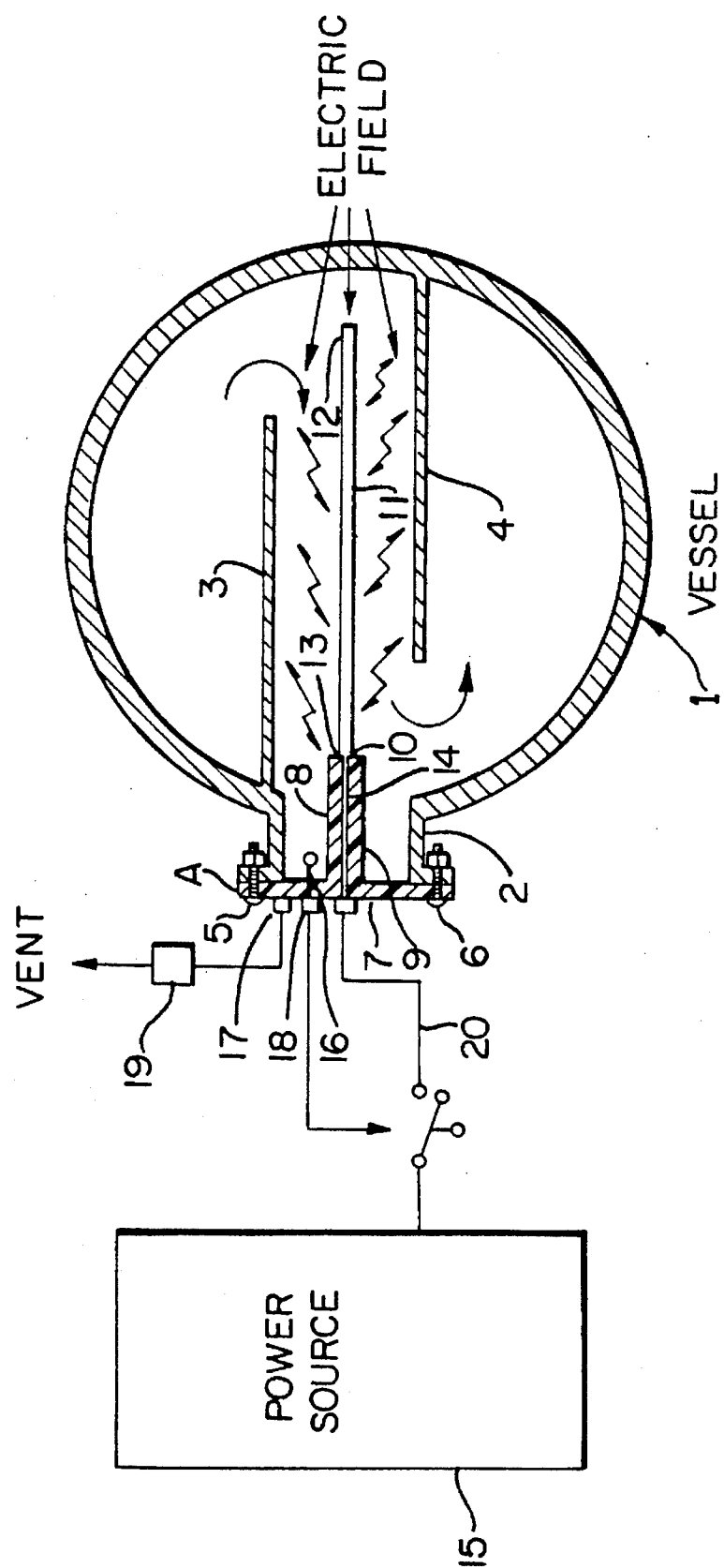
FIG. 1 is a view illustrating the preferred embodiment shown connected to a cut-a-way vessel, in a manner, so as to supply electricity to an electrical field.

There are many methods for supplying high potential electrical energy for the purpose of impressing an electrical charge onto electrically conductive dispersed matter. In all cases the high potential energy is supplied from a high voltage source located outside of the chamber or container where electrical charge is applied. The present invention also supplies the electrical energy from outside the vessel in which charge is being applied, however, the connection from the high voltage source can be made externally, whereas in known methods and devices, an internal connection to the power source is required.

External connection to the power source, as is accomplished with the present invention, is much more convenient and safer. Furthermore, with the present invention, the connection to the power source can be made with shielded flexible cable, similar to spark plug cable connections used in automobile engines.

The method of connection provided by the present invention precludes the possibility of a pressure leak which would permit migration of the material receiving the electrical charge, to the high voltage source. The present invention, therefore prevents such a hazard from occurring, thus avoiding damage to the power source (step up transformer, rectifier, etc.)

Referring to FIG. 1 There is shown a circular vessel 1 with a flanged side opening 2. Attached to the internal surface of the vessel wall adjacent to the opening 2 are electrically grounded partitions 3 and 4. Inserted through the opening 2 and secured in such a manner as to effect a tight seal using a multitude of bolts as depicted by 5 and 6 is a high potential electrode A. The electrode has a mounting closure 7 constructed from an electrically non conductive material such as fiberglass reinforced plastic. The closure 7 is secured to opening 2 by a multitude of bolts 5 and 6 to form a tight seal that will contain the contents inside of vessel 1. Integrally attached to closure 7 is a cylindrical elongated extension 8 constructed from an electrically non conductive material such as fiberglass reinforced plastic. The cylindrical elongated extension 8 contains an opening 9 that penetrates the full length of the cylindrical extension 8 continuing through closure 7 to its outside surface. On the end of the cylindrical elongated extension, opposite the closure 7, centered on opening 9, is a larger threaded opening 10 of sufficient size and depth to effect a tight seal between the cylindrical elongated extension 8 and a stainless steel rod 11. The rod 11 has one plain end 12 and one threaded end 13. Attached to the threaded end 13 is a smaller stainless steel rod 14 that will fit through the opening 9 and which is long enough to extend to the outside surface of the closure 7 with sufficient extension for connection of the power supply 20 from the power source 15. Located on the closure 7 in an area above the extension 8 are two threaded openings 16 and 17. Opening 16 can be used for the connection of a liquid level sensor 18 that will detect the absence of a liquid above the electrode A for shutting off the electricity thereto, if such absence is detected. Opening 17 can be used for connection of a venting device that will bleed off vapor that becomes entrapped above the electrode A.

In operation the electrode assembly A receives high potential electrical energy from a power source 15 fed through power supply 20 to the stainless steel rod 11 establishing an electric field of electric current flowing between the electrically charged stainless steel rod 11 and the electrically grounded partitions 3 and 4. Finely dispersed electrically conductive matter will receive an electrical charge upon passing through the electric field.

From the foregoing it will be seen that this invention is one well adapted to attain all the ends and objects here in above set forth, together with other advantages which are obvious and which are inherent to the apparatus.

It is to be understood that certain features and sub-combinations are of utility and may be employed without reference to other features and sub combinations. This is contemplated by and is within the scope of the claims. Although the foregoing invention has been described in some detail by way of illustration and example, for purposes of clarity of understanding, it will be obvious that certain changes and modifications may be practiced within the scope of the appended claims.

What is claimed is:

1. An apparatus for supplying high potential electrical energy to dispersed electrically conductive matter suspended in a relatively non-conductive continuous phase atmosphere held in the interior of an enclosed vessel comprising, in combination:

an enclosed vessel;

an opening formed in an exterior wall of said enclosed vessel, said opening providing access from the exterior to the interior of said vessel;

electrically grounded partition means disposed in said vessel adjacent to said opening;

an electrically non-conductive mounting closure means tightly secured to said opening so as to prevent the escape of any fluid from the interior of said vessel through said opening;

said electrically non-conductive mounting closure means including an inside surface and an outside surface, and having a cylindrical elongated electrically non-conductive extension having first and second ends secured to said inside surface at the first end, with the second end extending through said opening into the interior of said vessel;

said mounting closure means with said extension having a first opening formed therein extending entirely therethrough from said outside surface of said mounting closure means to said second end of said extension, the portion of the opening proximate said second end being of a larger diameter and being threaded;

a rod formed from electrically conducting material and including a larger diameter portion and a smaller diameter portion, the section of the larger diameter portion adjacent the smaller diameter portion having a threaded region engaging the threaded portion of said first opening, the remainder of the large diameter portion extending into the interior of said vessel, said smaller diameter portion extending through said first opening to and beyond said outside surface of said mounting closure means; and means for supplying power attached to said smaller diameter portion of said rod adjacent said outside surface of said mounting closure means to allow high potential electric energy from a power source to be applied to said rod in the interior of said vessel.

2. The apparatus of claim 1, including a second opening formed in said electrically non conductive mounting closure means between said inside and outside surfaces thereof, and sensing means secured to said further opening; said sensing means being capable of sensing the presence or absence of fluid, and if sensing the absence of fluid over said rod, shutting off said high potential electric energy.

3. The apparatus of claim 2 wherein said second opening is threaded, and said sensing means is threaded into and captured in said further opening.

4. The apparatus of claim 1, including a second opening formed in said electrically non conductive mounting closure means between said inside and outside surfaces thereof, and venting means secured to said further aperture; said venting means being capable of venting vapor from the interial of said vessel over said rod.

5. The apparatus of claim 4 wherein said second opening is threaded, and said venting means is threaded into and captured in said further aperture.

6. An apparatus for supplying high potential electrical energy to dispersed electrically conductive matter suspended in a relatively non-conductive continuous phase atmosphere held in the interior of an enclosed vessel comprising, in combination:

an enclosed vessel;

an opening formed in an exterior wall of said enclosed vessel, said opening providing access from the exterior to the interior of said vessel;

electrically grounded partition means disposed in said vessel adjacent to said opening;

an electrically non-conductive mounting closure means tightly secured to said opening so as to prevent the escape of any fluid from the interior of said vessel through said opening;

said electrically non-conductive mounting closure means including an inside surface and an outside surface, and having a cylindrical elongated electrically non-conductive extension having first and second ends secured to said inside surface at the first end, with the second end extending through said opening into the interior of said vessel;

said mounting closure means with said extension having a first opening formed therein extending entirely therethrough from said outside surface of said mounting closure means to said second end of said extension, the portion of the opening proximate said second end being of a larger diameter and being threaded;

a rod formed from electrically conducting material and including a larger diameter portion and a smaller diameter portion, the section of the larger diameter portion adjacent the smaller diameter portion having a threaded region engaging the threaded portion of said first opening, the remainder of the larger diameter portion extending into the interior of said vessel, said smaller diameter portion extending through said first opening to and beyond said outside surface of said mounting closure means;

means for supplying power attached to said smaller diameter portion of said rod adjacent said outside surface of said mounting closure means to allow high potential electric energy from a power source to be applied to said rod in the interior of said vessel;

second and third threaded openings extending between the inside and outside surfaces of said mounting closure means;

sensing means secured to said second threaded opening; said sensing means being capable of sensing the presence or absence of fluid, and if sensing the absence of fluid over said rod, shutting off said high potential electric energy; and venting means secured to said third threaded opening; said venting means being capable of venting vapor from the interior of said vessel over said rod.

\* \* \* \* \*

UNITED STATES PATENT AND TRADEMARK OFFICE
CERTIFICATE OF CORRECTION

PATENT NO. : 5,458,757
DATED : October 17, 1995
INVENTOR(S) : Jerry Mac Edmondson It is certified that error appears in the above-indentified patent and that said Letters Patent is hereby corrected as shown below:

On the title page, item [76] Inventor, should read as follows:

-- Jerry Mac Edmondson --.

Signed and Sealed this

Sixteenth Day of January, 1996

Attest:

BRUCE LEHMAN

Attesting Officer *Commissioner of Patents and Trademarks*